(12) United States Patent
Hiner et al.

(10) Patent No.: US 7,883,608 B2
(45) Date of Patent: Feb. 8, 2011

(54) CATHODIC PROTECTION SYSTEMS

(75) Inventors: William Hiner, O'Fallon, MO (US); Lloyd Herbert King, Jr., Chesterfield, MO (US); James C. Keeven, O'Fallon, MO (US)

(73) Assignee: The Patent Store LLC, O'Fallon, MO (US)

( * ) Notice: Subject to any disclaimer, the term of this patent is extended or adjusted under 35 U.S.C. 154(b) by 776 days.

(21) Appl. No.: 11/823,556

(22) Filed: Jun. 28, 2007

(65) Prior Publication Data

US 2008/0105563 A1    May 8, 2008

Related U.S. Application Data

(63) Continuation-in-part of application No. 11/593,827, filed on Nov. 7, 2006, now Pat. No. 7,384,297.

(51) Int. Cl.
*C23F 13/20* (2006.01)
*C23F 13/06* (2006.01)

(52) U.S. Cl. .................. 204/196.21; 204/196.1; 204/196.36; 204/196.37; 205/734; 205/740

(58) Field of Classification Search .............. 204/196.1, 204/196.21, 196.22–196.25, 196.34, 196.36; 205/730–734, 740
See application file for complete search history.

(56) References Cited

U.S. PATENT DOCUMENTS

| 4,681,986 | A  | * | 7/1987  | Settineri ................... 174/84 R |
|---|---|---|---|---|
| 5,561,269 | A  | * | 10/1996 | Robertson et al. ............. 174/92 |
| 6,246,003 | B1 | * | 6/2001  | Ferris et al. ................... 174/92 |
| 6,280,235 | B1 | * | 8/2001  | Radliff ........................ 439/467 |
| 2004/0057174 | A1 | * | 3/2004 | Al-Mahrous ................. 361/57 |
| 2006/0183382 | A1 | * | 8/2006 | King et al. .................. 439/798 |
| 2006/0270785 | A1 | * | 11/2006 | Dower ........................ 524/571 |

* cited by examiner

*Primary Examiner*—Bruce F Bell
(74) *Attorney, Agent, or Firm*—Jacobson & Johnson LLC

(57) ABSTRACT

A cathodic protection system wherein a metal structure is electrically connected to a sacrificial anode through a self encapsulating wire connector that can be assembled by unskilled persons and can be maintained in a protective condition around an electrical junction to enable the electrical junction to protected from an underground environment.

24 Claims, 5 Drawing Sheets

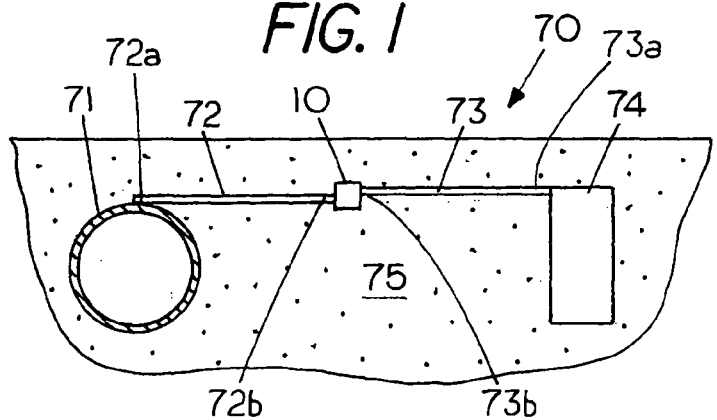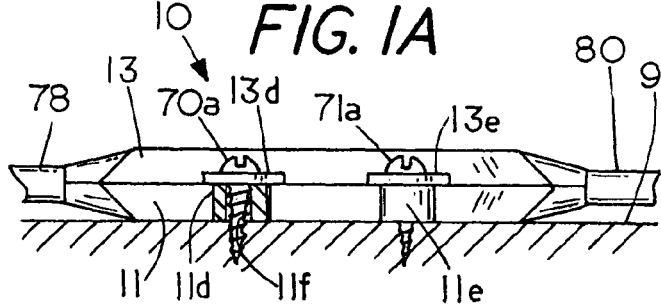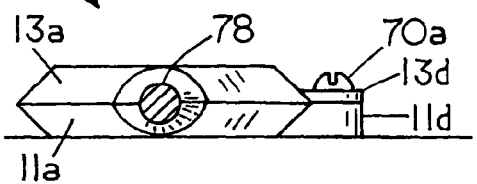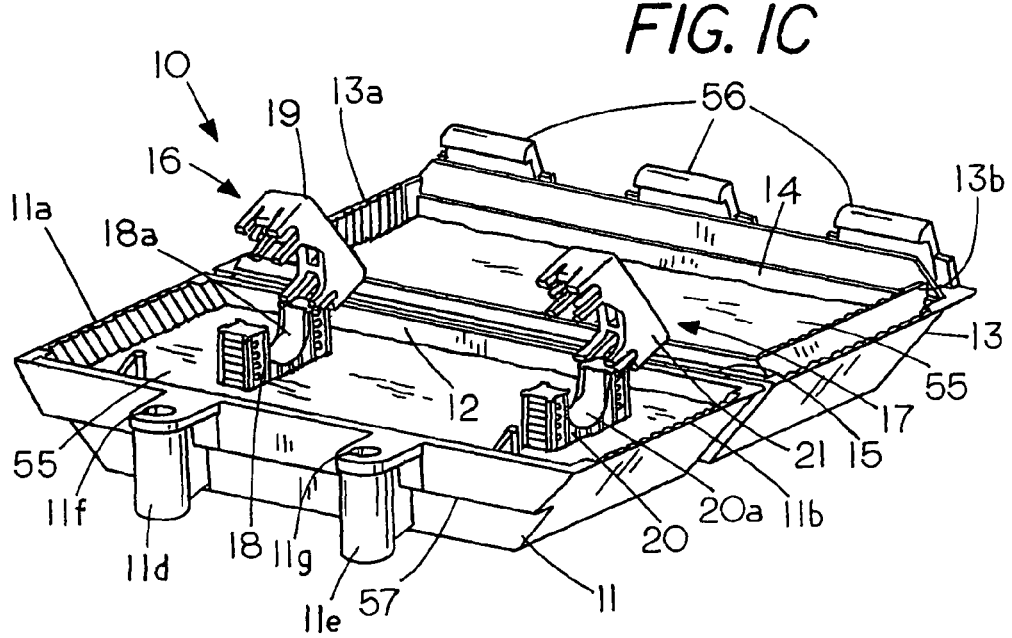

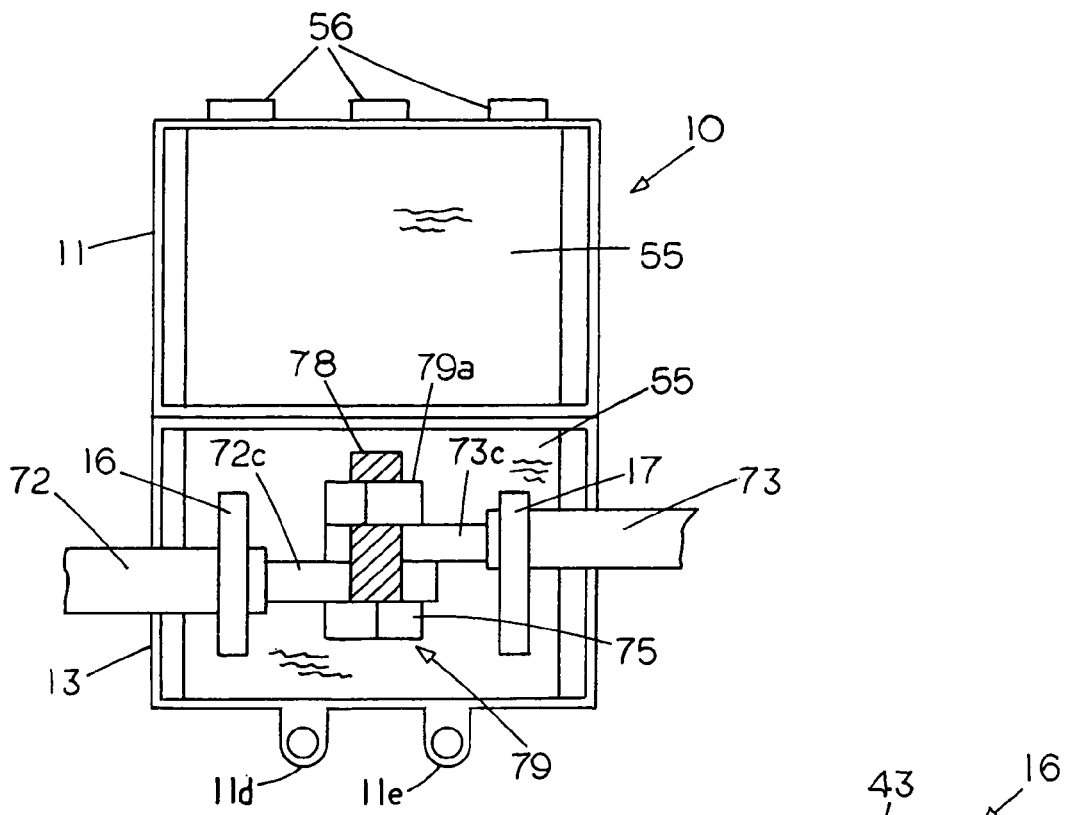
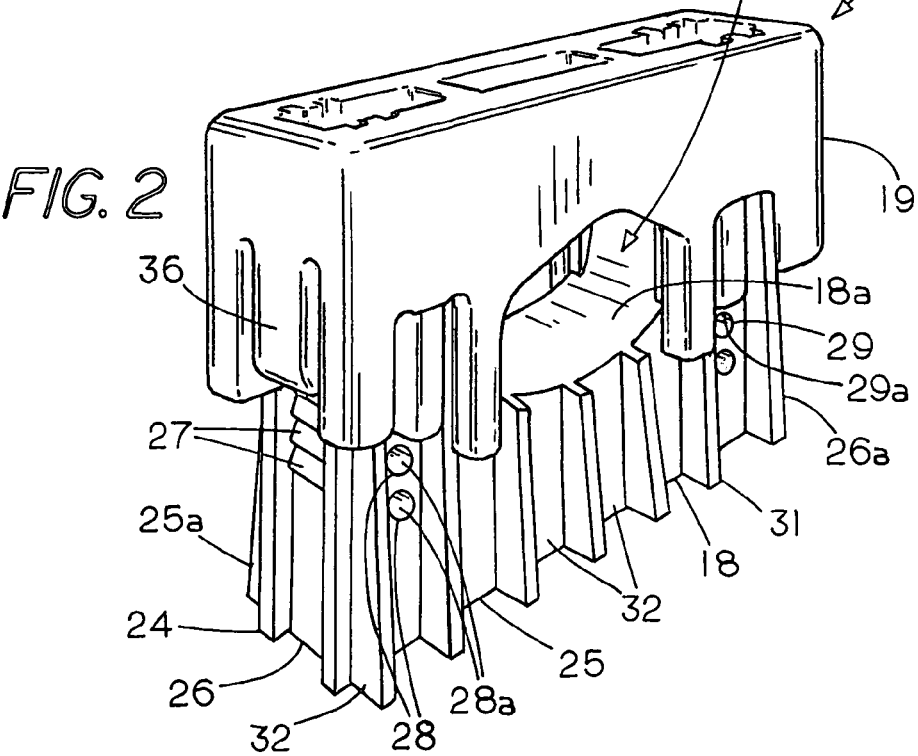

CATHODIC PROTECTION SYSTEMS

CROSS REFERENCE TO RELATED APPLICATIONS

This application is a continuation in part of U.S. patent application Ser. No. 11/593,827 filed Nov. 7, 2006 now U.S. Pat. No. 7,384,297 titled Wire Connector.

FIELD OF THE INVENTION

This invention relates generally to cathodic protection systems and, more specifically, to cathodic protection systems with wire connectors that can be buried as part of the cathodic protection system.

STATEMENT REGARDING FEDERALLY SPONSORED RESEARCH OR DEVELOPMENT

None

REFERENCE TO A MICROFICHE APPENDIX

None

BACKGROUND OF THE INVENTION

Cathodic protection systems are known in the art to protect metal structure, and particularly underground metal structures by creating an electrochemical cell with the protected metal structure as the cathode of the electrochemical cell. By electrically securing a sacrificial anode to the metal structure one can create an electrochemical cell that largely limits the corrosion to the anode rather than the cathode i.e. the metal structure.

Examples of cathodic system that protect underground systems are shown in Hunter U.S. Pat. No. 2,527,361; Marsh et al. U.S. Pat. No. 3,186,931; and Dukat U.S. Pat. No. 4,511,444. Typically, the anode, which is referred to as the sacrificial anode, corrodes while the metal structure is spared. In order for the system to operate properly the metal structure, which is spaced from the sacrificial anode, needs to be in electrical communication with the sacrificial anode. In a great many instance this involves joining an electrical lead such as a conductor cable from the metal structure (cathode) to a metal conductor extending from the sacrificial anode. In order to maintain the cathodic protection system and prevent corrosion at the junction of the wire connectors, which are usually heavy wire cables, one needs to maintain a waterproof, electrically insulated seal around the cable junction between the wire conductor from the metal structure and the wire conductor from the anode. The junction is usually located underground between the protected metal structure (cathode) and the sacrificial anode and needs to be protected from the hostile underground environments including freezing and thawing of the soil which can cause expansion and contraction of the soil around the wire connector which can cause the wire junction in the wire connector to slip and expose the electrical junction to the underground environment thereby rendering the cathodic protection system ineffective. In general, the creation of cathodic protection systems can create unique field problems not only due to the hostile underground environment but also to the inexperienced or personnel unfamiliar to electrical connections who may be called upon to form a cable connection between the metal structure and the sacrificial anode as they bury a pipe line or the like.

One of the difficulties in creation of cathodic protection system is to ensure that when the system is installed in the field that all the underground electrical connections are properly secured and that the electrical junctions are and remain in a waterproofed condition. While some wire connectors require special tools, others require a lengthy time for a resin to set. In contrast, the present invention provides for an immediate on-the-go and convenient waterproof field securement of electrical conductors, which are often large cables, to each other. In addition the wire connector of the present invention ensures the electrical junction can remain protected from an underground environment as the wire connector maintains a waterproof seal around the electrical junction in a changing underground environment even though the persons assembling the electrical connectors may not be skilled in the electrical art.

SUMMARY OF THE INVENTION

A cathodic protection system for protection an underground metal structure with the metal structure having an electrical conductor with a free end electrically joined to a free end of further electrical conductor with the further electrical conductor connected to a sacrificial anode. The joined ends of the electrical conductors are isolated from the surrounding soil by a sealant containing wire connector comprising a first housing having a chamber therein and a second housing mateable with the first housing to form an enclosure for on-the-go supporting the joined bared ends of electrical conductors therein with the wire connector including at least one latchable wire retainer that can be clamped around an electrical conductor to immediately hold and maintain the electrical conductor in position within the wire connector to thereby maintain the joined bared ends in a waterproof relationship within the confines of the wire connector. By closing the housings even an inexperienced person or one unfamiliar with the electrical art can self encapsulate the joined ends of the electrical conductors in a sealant without the user having to come into contact with the sealant.

BRIEF DESCRIPTION OF THE DRAWINGS

FIG. 1 is a cross sectional view of a cathodic protection system with a sealable wire connector;

FIG. 1A is a partial front view of the wire connector of FIG. 1C secured to a support surface;

FIG. 1B is an end view of the wire connector of FIG. 1A;

FIG. 1C is a perspective view of the on-the-go sealable wire connector;

FIG. 1D is an open view of the wire connector of FIGS. 1A, 1B and 1C securing the electrical leads of the cathodic protection system of FIG. 1

FIG. 2 shown an isolated perspective view of a wire retainer;

DESCRIPTION OF THE PREFERRED EMBODIMENT

Figure 3:
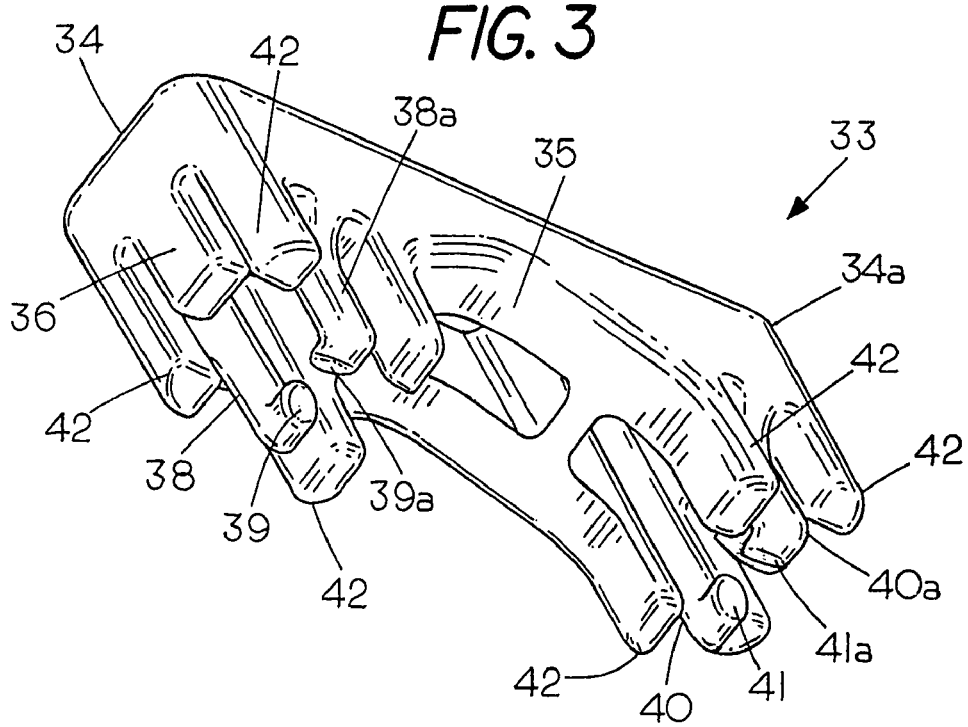
FIG. 3 show a perspective view of an underside of the jaw of FIG. 2.

FIG. 1 is a cross sectional view of an underground cathodic protection system 70 with the system including a metal structure, such as a pipeline 71 that is buried in soil 75 and in contact therewith. To protect the pipeline 71 from corrosion there is provide an underground sacrificial anode 74, which is located in a spaced condition from the pipeline 71.

The cathodic system 70 comprises a first electrical conductor 72 having a first end 72a and a second end 72b extending into wire connector 10 with the first end 72a in electrical communication with the pipeline 71. A second electrical conductor 73 having a first end 73a and a second end 73b with the first end 73a in electrical communication with the sacrificial anode 74 and the second end 73b extending into the wire connector 10 where it is electrically joined with the second end 72b of the first electrical conductor 72 to form an electrical joint or junction which is protected by wire connector 10.

The electrical joint or junction between the electrical conductor 72 and 73 is shown in FIG. 1D and includes a conventional split bolt connector 79 that includes a head 75 a split bolt threaded shank 78 having a nut 79a secured therein. As the split bolt connector 79 can be separate from the wire connector the two bared electrical leads 72c and 73c can be secured to each other before the electrical junction formed therein is encapsulated thus avoiding contact with the sealant 55 until after the electrical junction has been formed. As can be seen in FIG. 1D the electrical cable 72c and the electrical cable 73c are joined into an electrical connection or electrical joint by the split bolt connector 79. Once joined the cable 72 and the cable 73 are secured to the wire connector 10 by latchable retainers 17 and 16.

FIG. 1 shows the cathodic protection system 70 with the wire connector 10 in the closed condition around the electrical junction shown in FIG. 1D. In this condition wire connector 10 encapsulates the bared end 72c and the bared end 73c, which are electrically joined to each other, to protect them from the underground environment. While FIG. 1 shows the wire connector in the closed condition FIG. 1D shows the wire connector in the open position ready to self encapsulate the split bolt connector 79 and the junction between the bared wire ends 72c and 73c through closure of housing 11 and 13.

FIG. 1D shows a second housing 11 mateable to the first housing 13 to form an enclosure for supporting the electrical joint; and latchable wire retainers 17, 16 secured to one of the housings, the latchable wire retainers 17, 16 each have a first jaw with a wire support surface and a second jaw with a wire support surface with each of the latchable wire retainers having an open condition for laterally inserting an electrical conductor between the first jaw and the second jaw and then bringing the first jaw and the second jaw into clamping engagement around a peripheral wire surface by bringing the first jaw toward the second jaw. Each of the wire retainers 17 and 16 remain in a sealant free condition even though the base of the wire retainers are located in the sealant 55.

An advantage of the wire connector 10 is that the latchable retainers can be used to hold the wire junction in place in the wire connector. In contrast, in underground wire connectors where the electrical leads are not restrained the freezing and thawing of soil can cause the wire connector to move with respect to the wire junction which can result in exposing the wire junction to the surrounding soil or soil moisture. While two latchable retainers are shown it is envisioned that a single latchable retainer can also be used to secure the electrical conductors therein from lateral displacement within the wire connector.

The wire connector 10 is more thoroughly shown and described in FIG. 1A to FIG. 9. FIG. 1C is a perspective view of an open-face electrical connector 10 that permits on-the-go securement and sealability of an electrical junction after an electrical connection has been formed. The open-face wire connector 10, which is a clamshell type wire connector, is shown in a sealant carrying condition. Wire connector 10 includes a first open housing 11 and a second open housing 13. Housings 11 and 13 are formed of an electrical insulating material such as a polymer plastic. First housing 11 includes a first end wall 11a, a second end wall 11b and an open top empty chamber 12 for receiving a sealant 55 and second housing 13 includes a first end wall 13a, a second end wall 13b and an open top chamber 14 for holding a sealant 55. In the embodiment shown a sealant 55 is located in both housing 11 and housing 13 and extends upward to partially fill the compartment therein. Consequently, when the housings 11 and 13 are closed the sealant flows around and encapsulates the electrical junction held between the wire retainers 16 and 17. While sealant is shown in both housings it is within the scope of the invention to have only one of the housings contain the sealant. The amount of sealant is selected based on the size of the wire connector 10 and the size of the wires to be protected. That is, a the volume of the viscous sealant 55, in relation to the volume within the wire connector is such that when the wire connector is brought to the closed condition (FIG. 1A, FIG. 1B) the viscous sealant is automatically forced to flow around the electrical junction formed in the connector 79 and thereby self encapsulate the electrical junction through the mere closing of the housing 11 and housing 13. Consequently, one can quickly encapsulate the electrical junction with a viscous sealant without having to handle the sealant. In addition, since the sealant 55 is viscous and remains in a viscous state one need not wait for the sealant to set or cure. Also with the viscous sealant 55 located in housing 11 and 13 housing and the latchable wire retainers 17, 16 protruding from the sealant (FIG. 1C) it enables one in the field to latch wires therein without the user having to contact the viscous sealant. Yet by closing the housing 11 and housing 13 one is ensured that viscous sealant is forced around the connecter 79 and the electrical junction formed therein to protect the electrical junction and the connector 79 from a hostile underground environment.

In the preferred embodiment a preferred sealant 55 comprises a viscous sealant such as silicone or the like which is retained in the housings 11 and 13 even though the wire connector might be tipped during handling. Other types of sealant, such as epoxy sealants, could also be used in the wire connector although such sealants would require mixing and setting of the sealants. While the invention is shown with the use of a viscous sealant therein it can be appreciated that the open face connector can also be used without sealant since the retainers can secure the electrical junction within the confines of the wire connector 10.

Open housings 11 and 13 are hinged to each other and form an enclosure when the open housings 11 and 13 are mated to each other. More specifically, housing 13 has a mating shape with housing 11 so that when the open ends of housing 11 and housing 13 are brought into engagement they form an enclosure for supporting an electrical wire branching connection therein. It is noted that the enclosure also functions to confine the sealant therein. Housing 11 includes a set of three snap extensions 56 located on the open end of housings 13 for lockingly engaging an opposing lip 57 located on a ledge of housing 11 to maintain the engagement of housing 11 and housing 13 in a closed condition.

In the embodiment shown housings 11 and 13 are preferably made from a polymer plastic and include a living hinge 15 for pivotally connecting and maintaining the housings 11 and 13 proximate each other when the wire connector 10 is in an open condition. In addition, hinge 15 allows one to rotate second housing 13 one hundred eighty degrees to bring second housing 13 into mated engagement with the housing 11. Located on the front side of housing 11 is a first mounting post 11d having an opening 11f therein and a second mounting post 11e having an opening 11g therein.

Open face connector 10 can be used in various modes. If there is no sealant present in chambers 12 or 14 the connector 10 can be used to form a protective housing around an electrical junction by closing housing 13 on housing 11. On the other hand if a user wants to use a sealant on certain connections but not on other types of connections the user can place the sealant in those open face connectors that require sealant and leave the other connections without sealant.

Referring to first housing 11, first housing 11 includes a first latchable wire retainer 16 and a second latchable wire retainer 17 spaced therefrom with both the wire retainers 16 and 17 openable for laterally inserting a wire therein and subsequently encompassing and securing the wire to the housing by clamping the wire in the wire retainers 16 and 17.

First wire retainer 16 comprises a base member or lower jaw 18 having a wire supporting surface 18a and an adjustable locking cover or upper jaw 19 for clamping around a portion of a wire to secure an electrical wire therein. Similarly, second wire retainer 17 comprises a lower jaw or base member 20 having a wire supporting surface 20a and an adjustable locking upper jaw or cover 21 for clamping around a portion of a wire to secure an electrical wire therein.

In the normal condition second housing 13 is preferably held in an open and extended condition. In the embodiment shown in FIG. 1C, hinge 15 includes a bias to hold the second housing 13 in a laterally extended condition from first housing 11 so as to make the latchable wire retainers 16 and 17 readily accessible for supporting the wire thereon.

FIG. 1A is a partial front view of the wire connector 10 and FIG. 1B is an end view of the wire connector of FIG. 1A secured to a support surface 9 showing the mounting post 11d (in section) and the mounting post 11e which are integrally part of housing 11. In addition, tabs 13d and 13e which are integrally part of housing 13 extend outward. Tab 13d extends over mounting post 11d to enable a fastener such as a screw 70a to be extended through the tab 13d and the mounting post 11d into the support surface 9.

Similarly, Tab 13e extends over mounting post 11e to enable a fastener such as a screw 71a to be extended through the tab 13e and the mounting post 11e into the support surface 9. This provides a two-fold benefit, first one can secure the wire connector 10 in a closed condition, and second one can secure the wire connector to a fixed location. In addition, if desired the mounting posts and tabs can be secured to each other to hold the wire connector 10 in a closed condition without securing the wire connector to a support surface. In the embodiment shown a wire 78 extends from one side of wire connector 10 and a wire 80 extends from the opposite side of the wire connector 10 while the one side of the housing partially nests in the other side to prevent sealant from escaping. That is the edges of one container can extend partially into the other container to inhibit sealant from flowing therepast.

FIG. 2 shows an isolated perspective view of latchable wire retainer 16 of FIG. 1C. Latchable wire retainer 16 generally comprises two main parts, namely lower jaw 18 and upper jaw 19. Jaw 18 comprises a body 24 having a first side 25, a second side 25a, a first end 26, a second end 26a, and a wire supporting surface 18a. Although the wire-supporting surface can comprise a variety of shapes, in the embodiment of FIG. 2, wire supporting surface 18a comprises a generally semi-circular shape and can function to support wires of varying sizes.

Located on end 26 is a set of end teeth 27 and similarly, located on end 26a is an identical set of teeth (not shown). The set of end teeth are located diametrically opposed to each other on ends 26 and 26a of body 24. Body 24 also includes a first set of holes 28 and a second set of holes 29 extending from the first side 25 to the second side 25a of body 24 with first set of holes 28 shown in the embodiment of FIG. 2 located proximate the first end 26 of body 24 and the second set of holes 29 shown located proximal the second end 26a of body 24. Body 24 also includes a plurality of ribs 31 extending from sides 25 and 25a and ends 26 and 26a with elongated ribs 31 forming a plurality of guide channels 32 therebetween with the ribs enhancing the rigidity and strength of the jaw.

Figure 4:
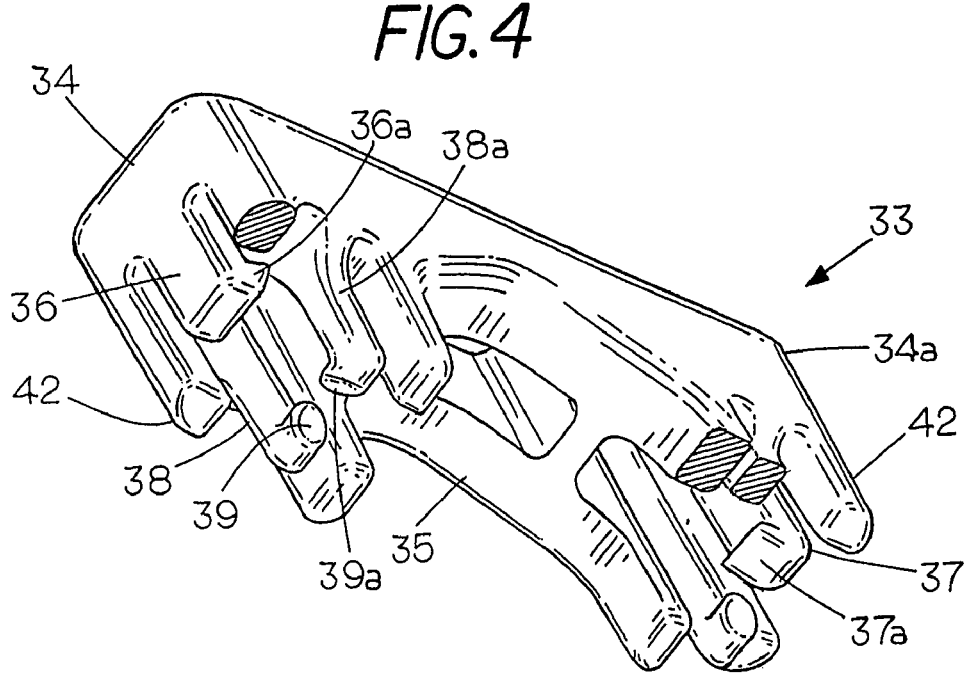
FIG. 4 also show a perspective view of an underside of the jaw of FIG. 2.

FIG. 3 shows a perspective view of an underside of the one-piece jaw 19 of FIG. 2 and FIG. 4 shows a perspective view of the one-piece jaw 19 partially in section. Jaw 19 includes a first end 34, a second end 34a, and a wire-engaging surface 35. Extending from first end 34 is a first integral resilient latch 36 having a tooth 36a for lockingly engaging the set of teeth 27 and extending from second end 34a is a second integral resilient latch 37 having a tooth 37a for lockingly engaging a set of teeth (not shown) located on the end 26a of jaw 18.

Jaw 19 also includes a first pair of resilient extensions 38 and 38a and a second pair of resilient extensions 40 and 40a. The first pair of extensions 38 and 38a are shown located proximal the first end 34 of jaw 19 and the second pair of extensions 40, 40a are shown located proximal the second end 34a of jaw 19. Extension 38, having a transversely extending pivot pin 39 and similarly extension 38a having a transversely extending pivot pin 39a. Pivot pins 39 and 39a are diametrically opposed to each other for locking and rotateable engagement with a cylindrical shoulder 28a forming hole 28 (FIG. 2) and for locking and rotateable engagement with a cylindrical shoulder 29a forming hole 29 (FIG. 2) of jaw 18. Similarly, extension 40 includes a pivot pin 41 and extension 40a includes a pivot pin 41a with the pivot pins 41 and 41a positioned diametrically opposed to each other for rotateable locking engagement with the shoulders of holes 28 and 29. Referring back to FIG. 3, it is noted that a feature of the present invention is that extensions 38 and 38a and the extensions 40 and 40a have opposing pins. More specifically, the opposing pins 39 and 39a are mateable to the shoulders surface 28a of the hole 28.

Figure 5:
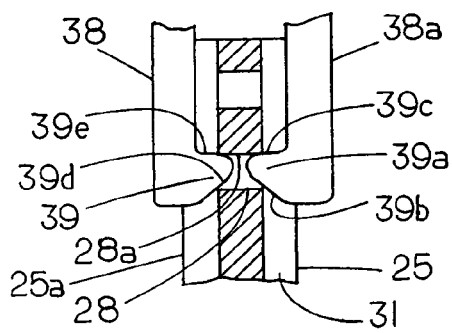
FIG. 5 is a partial cross-sectional end view showing the interaction between the extensions of the upper jaw and the holes in a lower jaw.

FIG. 5 is a partial cross-sectional end view showing the interaction between resilient extension 38 of jaw 19 and one end of shoulder 28a of one of the holes 28 of jaw 18 and extension 38a and an opposite end of shoulder 28a of one of the holes 28 of the jaw. As can be seen when the resilient extensions are in the position shown in FIG. 5 the pins 39 and 39a extend into the hole 28 to engage cylindrical shoulder surface 28a therein.

Pin 39 has a lower angled face 39d, which allows pin 39 to be disengaged as extension 38 is pushed downward. That is, the angled face 39d guides pin 39 transversely outward as a downward force is applied to extension 39. Similarly, pin 39a has a lower angled face 39b, which allows pin 39a to be disengaged as extension 38a is pushed downward. That is the angled face 39b guides pin 39 transversely outward as a downward force is applied to extension 39 and the angled face 39d guides pin 39 transversely outward as the downward force is applied to extension 38.

Figure 5A:
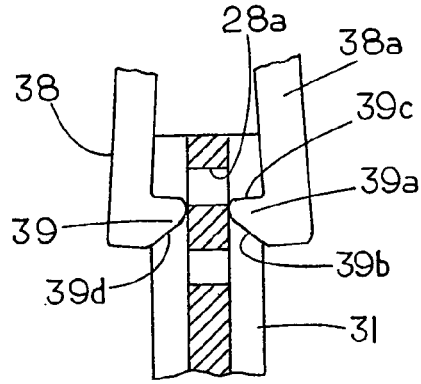
FIG. 5A is a partial cross-sectional end view showing the disengagement between the extensions of the locking cover and the holes of a lower jaw as the upper jaw is pushed into a closed condition.

FIG. 5A shows the pin 39 and the pin 39a moving transversely outward of the retaining shoulder 28a as a downward force is applied to the extensions 38 and 38a through jaw 19. The opposing pins 39 and 39a, which are mounted on resilient extensions 38 and 38a enable one to quickly engage the upper and lower jaw. That is, they prevent upward displacement of upper jaw 19 with respect to lower jaw 18 but not in the downward direction thereby enabling one to snug the upper jaw 19 around any wires located in lower jaw 18. In addition, if only one set of the pivot pins 39 and 39a of upper jaw 19 on the extensions 38 and 38a is engaged at the same time, as illustrated in FIG. 1, it permits rotational engagement between upper jaw 19 and lower jaw 18 to enable jaw 19 to be pivotally opened to permit lateral insertion of a wire between jaw 19 and jaw 18. Jaw 19 can then be pivoted around the wires until the extensions 40 and 40a (FIG. 3) with their respective pins 41 and 41a are engaged with the lower jaw 18. Once in engagement one can push down on the upper jaw 19 and snug the upper jaw 19 around any wires located in the lower jaw 18. In contrast to the angled faces 39b and 39d the upper transverse faces 39c and 39e engage the interior shoulder surface 28a to prevent withdrawal of the pin 39a as shown in FIG. 5.

A reference to FIG. 2 and FIG. 3 shows that jaw 19 further includes a set alignment members 42 for mating engagement with the guide channels 32 of base member 18 to provide for an alignment of jaw 19 to jaw 18.

In the process of securing jaw 19 to jaw 18, the diametrically opposing pins 39, 39a of pair of extensions 38, 38a engage the first slot of set of holes 28 to pivotably attached jaw 19 to jaw 18. Once pivotally attached to jaw 18, jaw 19 is then rotated to mate the alignment members 42 of jaw 19 with the guide channels 32 of jaw 18. The mating of alignment members 42 with the guide channels 32 results in the wire supporting surface 18a of jaw 18 and the wire engaging surface 35 of jaw 19 cooperating to form an opening 43 for receiving a portion of a wire therein.

The diametrically opposing pins 41, 41a of pair of extensions 40, 40a are then mated to a set of holes 29 as shown in FIG. 2. Jaw 19 is then pushed towards jaw 18 to further lock or latch jaw 19 to jaw 18 through the engagement of the tooth of latch 36 of jaw 19 with the set of teeth of jaw 18.

In regards to opening 43, it is noted that the size of opening 43 can be adjusted to accommodate electrical wires of different shapes and sizes. The size of opening 43 is adjusted through the displacement of jaw 19 with respect to jaw 18. The set or desired size of opening 43 is then lockingly maintained by the engagement of pins 39, 39a of extension 38 and pins 41, 41a of extension 40 with respect to the set of holes 28 and 29 of jaw 18 and by the engagement of latches 36 and 37 of jaw 19 with respect to the teeth on lower jaw 18.

Figure 6:
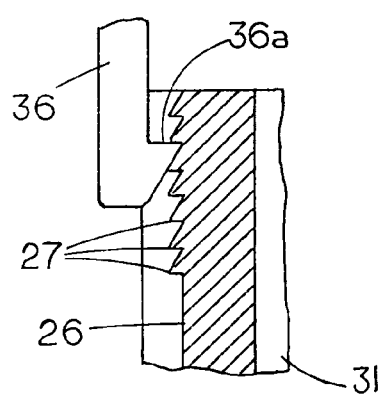
FIG. 6 is a partial cross-sectional side view showing the interaction between a latch of the upper jaw and a set of teeth of the lower jaw.

FIG. 6 is a partial cross-sectional side view showing the interaction between tooth 36a of latch 36 of jaw 19 and the set of teeth 27 of jaw 18 in locking the set size of opening 43.

After a portion of an electrical wire is supported on wire supporting surface 18a, jaw 19 is secured to jaw 18 and the wire engaging surface 35 of jaw 19 is moved towards wire supporting surface 18a thereby changing the size of opening 43. Referring to FIGS. 5 and 6, as jaw 19 is displaced towards jaw 18, the slot of set of holes 28, which pins 39 and 39a lockingly engage changes and the tooth of set of teeth 27, which tooth 36a of latch 36 lockingly engages also changes. Wire engaging surface 35 is moved towards wire supporting surface 18a until wire-engaging surface 35 engages and clamps a portion the electrical wire after which displacement of jaw 19 towards jaw 18 ceases.

Figure 7:
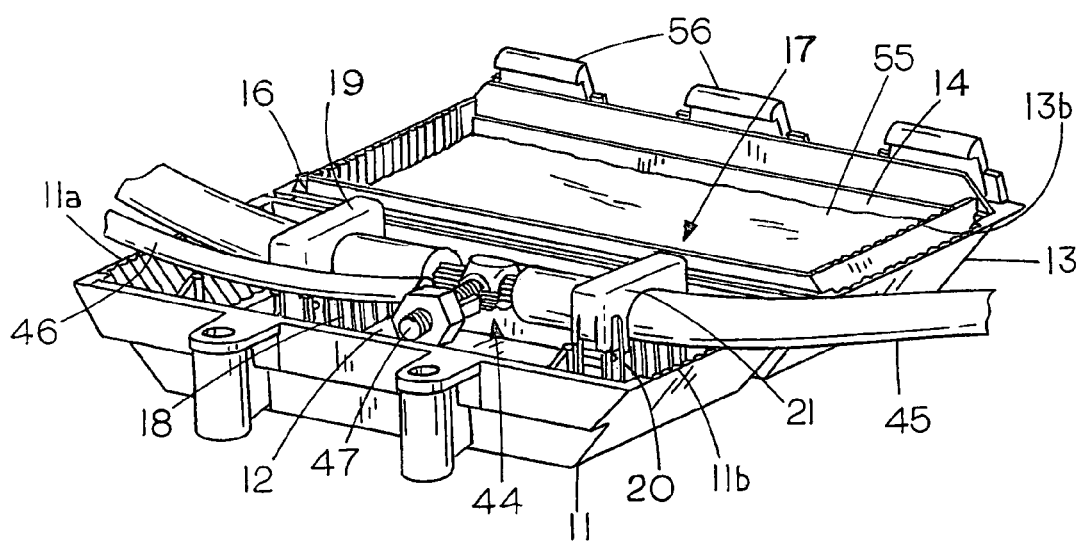
FIG. 7 is a perspective view showing the open-face electrical connector of FIG. 1 supporting an electrical wire branching connection therein.

FIG. 7 is a perspective view showing the open-face electrical connector 10 of FIG. 1 supporting an electrical wire branching connection 44 therein. In the use of the open-face electrical connector 10 as shown in FIG. 7, the electrical wire branching connection 44 is first made between a main electrical wire 45 and a secondary electrical wire 46 through the use of an electrical connection member comprising a split bolt connector 47. It is noted that the electrical connection member that can be used for the present invention is not limited to a split bolt connector and that other types of electrical connection member can be used. A first insulated portion or section of main electrical wire 45 is then supported on jaw 18 of first wire retainer 16 and is lockingly secured thereto by jaw 19. A second insulated portion or section of main electrical wire 45 is then supported on jaw 20 of second wire retainer 17 and is lockingly secured thereto by jaw 21 with the electrical wire branching connection 44 located between first wire retainer 16 and second wire retainer 17.

Although not shown, once electrical wire branching connection 44 is secured in open-face electrical connector 10 between first wire retainer 16 and second wire retainer 17, the open end of first housing 11 is brought into mating engagement with the open end of second housing 13. The engagement of the open end of first housing 11 and the open end of second housing 13 causes the first end wall 11a of the first housing 11 and the first end wall 13a of the second housing 13 cooperate to form a seal around a third insulated portion of main electrical wire 45 and an insulated portion of secondary electrical wire 46. The second end wall 11b of the first housing 11 and the breakable end wall 13b of the second housing 13 also cooperate to form a seal around an insulated portion of main electrical wire 45 to confine the electrical wire branching connection 44 within the enclosure formed by the housings 11 and 13.

To provide for waterproof protection, the presence of a sufficient amount of a viscous sealant 55 in second housing 13 allows one to bring the second housing 13 into engagement and cause the sealant 55 in the housing 11 and 13 to flow around the split bolt connector 47 and the exposed portions of wires 45 and 46 to form a waterproof electrical wire branching connection 44 therein.

It is noted that the seals formed around wires 45 and 46 by end walls 11a, 11b, 13a, and 13b can be from a resilient or flexible nature of walls 11a, 11b, 13a, and 13b, or from the form-fitting knock out or by cutting a recess in walls 11a, 11b, 13a, and 13b, or by the combination thereof.

A further feature of the invention is that the retainers 16 and 17 provide a mechanical stop for the split bolt connector 44 that prevents the wires from being accidentally pulled free of the assembled wire connector 10.

Figure 8:
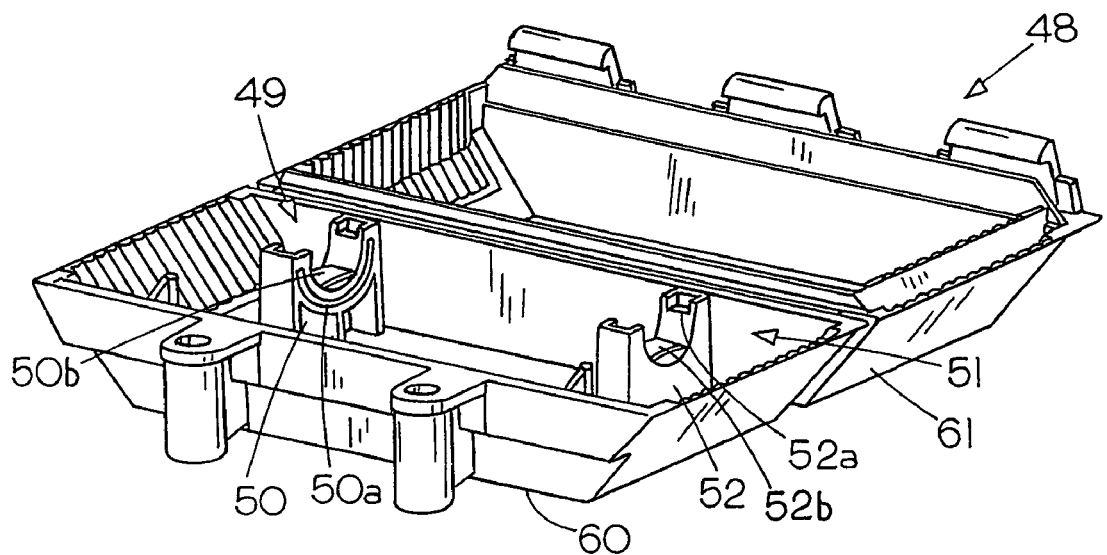
FIG. 8 is perspective views showing an embodiment of an open-face electrical connector similar to the on-the-go sealable wire connector of FIG. 1.
Figure 9:
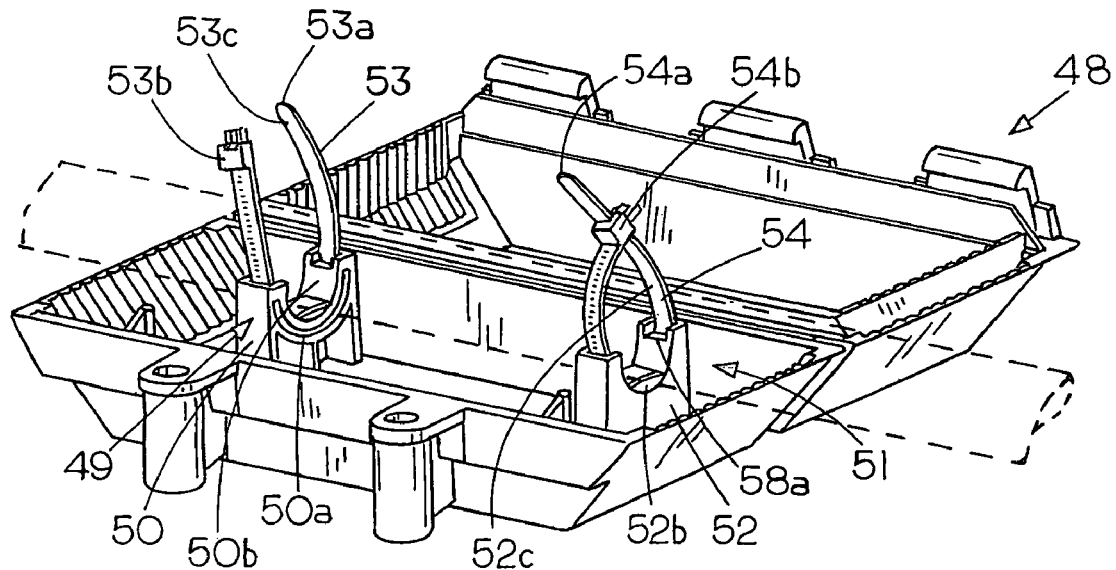
FIG. 9 is perspective views showing the open-face electrical connector of FIG. 8 having wire fastener members comprising cable ties.

FIGS. 8 and 9 are perspective views showing an alternative embodiment of an open-face electrical connector 48 having a first housing 60 and a second housing 61 that permits on-the-go securement and sealablity of an electrical junction in the joined housings after an electrical connection has been formed. Open-face electrical connector ...48 is similar to the open-face electrical connector 10 of FIG. 1 with open-face electrical connector 48 including a first wire retainer 49 comprising a first lower rigid jaw 50 having a first wire supporting surface 50b and a cable tie supporting channel 50a located beneath wire supporting surface 50b and an upper jaw comprising a flexible cable-tie 53 having a wire engaging surface 53c with the cable-tie threadable through cable tie channel 50a to form a latchable upper jaw 53.

Similarly, housing 60 including a second wire retainer 51 comprising a first lower rigid jaw 52 having a first wire supporting surface 52b and a cable tie supporting channel 52a located beneath wire supporting surface 52b and an upper flexible jaw comprising a flexible cable-tie 54 having a wire engaging surface 52c with the cable tie 53 threadable through cable tie channel 52a to form a latchable upper jaw 54. Cable ties are well known and generally comprises an elongated flexible band with a set of teeth thereon and a penetrateable head having teeth therein so that when the flexible band is extended through the head the teeth on the band slide past each other in one direction but engage each other if moved in opposite direction to prevent withdrawal of the band from the head.

In use of open-face electrical connector 48, a first portion of an electrical wire, shown in phantom, is supported on the wire supporting surface 50b of lower jaw or jaws 50 and a second portion of an electrical wire, shown in phantom, is supported on the wire supporting surface 52b of lower jaw or jaws 52. To latch a wire therein a free end 53a of cable-tie 53, which forms a first upper jaw, is extended through a locking end 53b of cable-tie 53 and the free end 54a of cable-tie 54, which forms a second upper jaw, is extended through a locking end 54b of cable-tie 54. The free end 53a of cable-tie 53 and the free end 54a of cable-tie 54 are then pulled to lockingly secure the first portion of the electrical wire to jaw 50 and the second portion of the electrical wire to jaw 52.

The electrical connector 10 and electrical connector 48 both allow one to clamp wires of different sizes therein since both allow one to adjust the upper jaw of the latchable retainers to accommodate wire or wires of different sizes.

The present invention also includes a method of forming a branch attachment comprising the steps of (1) forming a first housing 11 having a chamber 12 containing a first wire retainer 16 and a second wire retainer 17; (2) forming a second housing 13 having a chamber 14 therein; (3) placing a sealant 55 in at least one of the housings; (4) placing a wire 45 of an electrical wire branching connection 44 on a wire supporting surface 18a of the first wire retainer 16 and a wire supporting surface 20a of the second wire retainer 17; (5) securing the wire 45 of the electrical wire branching connection 44 to the first wire retainer 116 and the second wire retainer 17; and (6) placing an open end of the first housing and an open end of the second housing in engagement to cause the sealant in the housing to flow around an electrical junction of the electrical wire branching connection 44. The aforementioned method also can include the step of placing a sealant 55 in the first housing 11.

Thus the invention includes a method of inhibiting structural corrosion comprising the steps of: placing a metal structure in soil contact; extending an electrical conductor having a free end from the metal structure; placing a sacrificial anode having an electrical conductor with a free end extending therefrom in soil contact and in a spaced condition from the metal structure; joining the free end of electrical conductor of the metal structure to the free end of the electrical conductor of the sacrificial anode to form an electrical joint; placing a first housing having a chamber containing a retainer proximate the electrical joint; placing a second housing having a chamber therein on an oppose side of the electrical joint; securing at least one electrical conductor to the retainer to prevent lateral displacement of the at least one electrical conductor; and bringing an open end of the first housing and an open end of the second housing in engagement to form self encapsulating enclosure around the electrical joint.

The invention further includes a cathodic protection system comprising: a metal structure located underground and in soil contact; a sacrificial anode located underground and in a spaced condition from the metal structure to form an underground electrochemical cell; an electrical connector, the electrical connector holding the metal structure and the sacrificial anode in electrical contact with each other; a wire connector having a first housing having a chamber therein and a second housing having chamber therein, the second housing including an open end mateable with an open end of the first housing to form an enclosure for supporting the electrical connected therein; and a latchable wire retainer having an open condition for laterally inserting a wire therein and a closed condition wherein the latchable wire retainer clampingly engages the electrical conductor to inhibit lateral displacement of the electrical conductor with respect to the wire connector.

While the housings are shown with two latchable wire retainers therein if desired more or less latchable wire retainers could be used.

We claim:

1. A cathodic protection system comprising:
a metal structure located underground and in soil contact;
a sacrificial anode located underground and in soil contact with the sacrificial anode located in a spaced condition from the metal structure;
a first electrical conductor having a first end and a second end with the first end in electrical communication with the metal structure;
a second electrical conductor having a first end and a second end with the first end in electrical communication with the sacrificial anode and the second end electrically joined with said second end of said first electrical conductor to form an electrical joint;
a wire connector encapsulating the electrically joined second end of said first electrical conductor and the second end of the second electrical conductor, said wire connector including a first housing having a chamber therein;
a second housing mateable to the first housing to form an enclosure for supporting the electrical joint;
a viscous sealant located in said housing; and
a latchable wire retainer secured to one of the housings and protruding from said sealant to enable latching wires therein without the user having to contact the viscous sealant, said latchable wire retainer having a first jaw with a wire support surface and a second jaw with a wire support surface with the latchable wire retainer having an open condition and a closed condition wherein, said first jaw and said second jaw clampingly engage at least one of the electrical conductors to thereby inhibit lateral displacement of the electrical connector therein, said second jaw having a body with a first end, a second end, a first side, and a second side, said second jaw having a plurality of spaced ribs extending from the first end, the second end, the first side and the second side of the body, the ribs forming a plurality of guide channels therebetween, said second jaw including a first set of teeth located on the first end and a second set of teeth located on the second end of the second jaw.

2. The cathodic protection system of claim 1 including a hinge holding the second housing in a pivotable spaced condition from the first housing.

3. The cathodic protection system of claim 1 wherein the latchable wire retainer is secured to one of the housings in a spaced condition from a sidewall of the housing.

4. The cathodic protection system of claim 1 wherein the second housing includes an open end mateable with an open end of the first housing to form an enclosure for supporting an electrical connection therein.

5. The cathodic protection system of claim 1 including a second latchable wire retainer.

6. The cathodic protection system of claim 1 wherein the first jaw of the latchable wire retainer is pivotably attachable to the second jaw of the latchable wire.

7. The cathodic protection system of claim 1 including a first set of holes and a second set of holes extending from the first side to the second side of the second jaw.

8. The cathodic protection system of claim 1 wherein the viscous sealant is supported in at least one of the housings.

9. The cathodic protection system of claim 1 including a split bolt connector.

10. The cathodic protection system of claim 1 wherein the first and second housing comprise electrically insulating material with a mounting post for securing the electrical connector to an underground support surface.

11. The cathodic protection system of claim 1 wherein the first housing includes a lip and the second includes at least one snap extension for engagement with the lip to lockingly hold the first and second housing in a closed condition.

12. A cathodic protection system comprising:
a metal structure located underground and in soil contact;
a sacrificial anode located underground and in soil contact with the sacrificial anode located in a spaced condition from the metal structure;
a first electrical conductor having a first end and a second end with the first end in electrical communication with the metal structure;
a second electrical conductor having a first end and a second end with the first end in electrical communication with the sacrificial anode and the second end electrically joined with said second end of said first electrical conductor to form an electrical joint;
a wire connector encapsulating the electrically joined second end of said first electrical conductor and the second end of the second electrical conductor, said wire connector including a first housing having a chamber therein;
a second housing mateable to the first housing to form an enclosure for supporting the electrical joint;
a viscous sealant located in said housing;
a latchable wire retainer secured to one of the housings and protruding from said sealant to enable latching wires therein without the user having to contact the viscous sealant, said latchable wire retainer having a first jaw with a wire support surface and a second jaw with a wire support surface with the latchable wire retainer having an open condition and a closed condition wherein said first jaw and said second jaw clampingly engage at least one of the electrical conductors to thereby inhibit lateral displacement of the electrical connector therein,
said second jaw having a body with a first end, a second end, a first side, and a second side, said second jaw having a plurality of spaced ribs extending from the first end, the second end, the first side, and the second side of the body, the ribs forming a plurality of guide channels therebetween, said second jaw having a first set of teeth located on the first end and a second set of teeth located on the second end of the second jaw and a first set of holes and a second set of holes extending from the first side to the second side of the second jaw.

13. The cathodic protection system of claim 12 wherein the first jaw comprises:
a first end, a second end and a wire-engaging surface;
a first latch extending from the first end of the first jaw, the first latch having a tooth for lockingly engaging the first set of teeth of the second jaw;
a second latch extending from the second end of the cover, the second latch having a tooth for lockingly engaging the second set of teeth of the second jaw;
a first pair of flexible extensions located proximal the first end of the first jaw, the first pair of extensions each include a pin located thereon with the pins positioned diametrically opposed to each other for locking engagement with the first set of holes of the second jaw;
a second pair of flexible extensions located proximal the second end of the first jaw, the second pair of extensions each include a pin located thereon with the pins positioned diametrically opposed to each other for locking engagement with the second set of holes of the second jaw; and
a plurality of alignment members extending from the cover for mating engagement with the guide channels of first jaw to provide for an aligned uniformed connection of locking cover to the first jaw.

14. A cathodic protection system comprising:
a metal structure located underground and in soil contact;
a sacrificial anode located underground and in a spaced condition from the metal structure to form an underground electrochemical cell;
an electrical connector, said electrical connector holding said metal structure and said sacrificial anode in electrical contact with each other;
a wire connector having a first housing having a chamber therein and a second housing having chamber therein, the second housing including an open end mateable with an open end of the first housing to form an enclosure for supporting the electrical connected therein; and
a latchable wire retainer having a first jaw with a wire support surface and a second jaw with a wire support surface with the latchable wire retainer having an open condition for laterally inserting a wire therein and a closed condition wherein the latchable wire retainer clampingly engages the electrical conductor to inhibit lateral displacement of the electrical conductor with respect to the wire connector, said second jaw having a body with a first end, a second end, a first side, and a second side, said second jaw having a plurality of spaced ribs extending from the first end, the second end, the first side, and the second side of the body, the ribs forming a plurality of guide channels therebetween.

15. The cathodic protection system of claim 14 including a further latchable wire retainer with the further latchable wire retainer comprising a cable tie for securing a portion of the electrical wire therein.

16. The cathodic protection system of claim 15 wherein said second jaw includes a first set of teeth located on the first end and a second set of teeth located on the second end of the second jaw.

17. The cathodic protection system of claim 16 including a first set of holes and a second set of holes extending from the first side to the second side of the second jaw.

18. The cathodic protection system of claim 16 wherein the wire retainer and the further wire retainer supports an electrical connection therebetween.

19. The cathodic protection system of claim 14 wherein at least one of the housings includes a viscous sealant with the latchable retainer protruding from said viscous sealant in a sealant free condition.

20. A method of inhibiting structural corrosion comprising:
  placing a metal structure in soil contact;
  extending an electrical conductor having a free end from the metal structure;
  placing a sacrificial anode having an electrical conductor with a free end extending therefrom in soil contact and in a spaced condition from the metal structure;
  joining the free end of electrical conductor of the metal structure to the free end of the electrical conductor of the sacrificial anode to form an electrical joint;
  placing a first housing having a chamber containing a retainer having a first jaw with a wire support surface and a second jaw with a wire support surface and a plurality of spaced ribs extending from a first end, a second end, a first side, and a second side of a body of the second jaw with the ribs forming a plurality of guide channels therebetween proximate the electrical joint;
  placing a second housing having a chamber therein on an oppose side of the electrical joint;
  securing at least one electrical conductor to the retainer by clampingly engaging said first jaw and said second jaw to said at least one of the electrical conductors to prevent lateral displacement of the at least one electrical conductor;
  engaging a tooth located on a first latch of the upper jaw to a first set of teeth located on the first end of the second jaw and a tooth located on a second latch of the upper jaw a second set of teeth located on the second end of the second jaw to secure the first jaw to the second jaw;
  extending a set of pins located on a pair of resilient extensions located on the upper jaw to one of the set of holes extending from the first side to the second side of the second jaw to further secure the first jaw to the second jaw; and
  bringing an open end of the first housing and an open end of the second housing into a closed condition so that a viscous sealant therein can form a self encapsulating enclosure around the electrical joint thereby creating and maintaining a waterproof field.

21. The method of claim 20 including placing sufficient viscous sealant in the first housing and the second housing so that the step of forcing the viscous sealant around the electrical joint by bringing the open end of the first housing and the open end of the second housing is solely responsible for forming the self encapsulating enclosure around the electrical joint.

22. The method of claim 20 wherein the step of securing at least one electrical conductor to the retainer comprises securing the electrical conductor to the retainer in a sealant free condition prior to bringing the first housing and the second housing into the closed condition.

23. The method of claim 20 including the step of burying the wire connector underground with the wire connector in soil contact.

24. The method of claim 20 wherein the step of joining the free end of electrical conductor of the metal structure to the free end of the electrical conductor of the sacrificial anode to form an electrical joint comprises securing a split bolt connector thereto to each of the free ends.

* * * * *